G. P. FINNIGAN.
SPEED INDICATING MECHANISM.
APPLICATION FILED APR. 24, 1913.
1,165,082.
Patented Dec. 21, 1915.
6 SHEETS—SHEET 2.
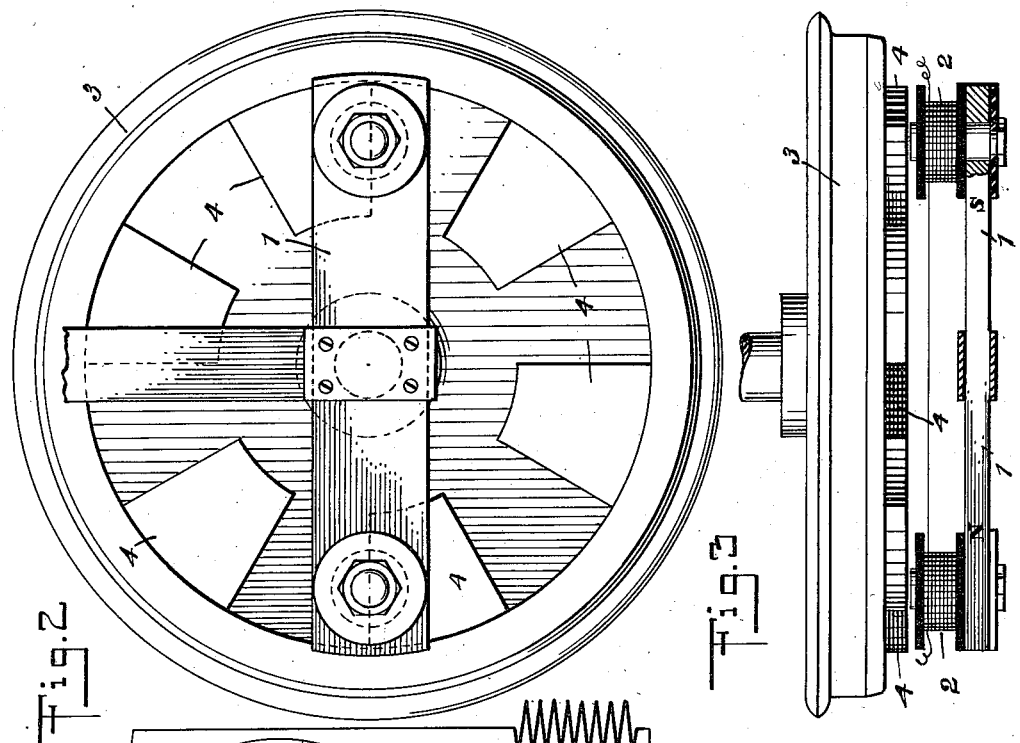
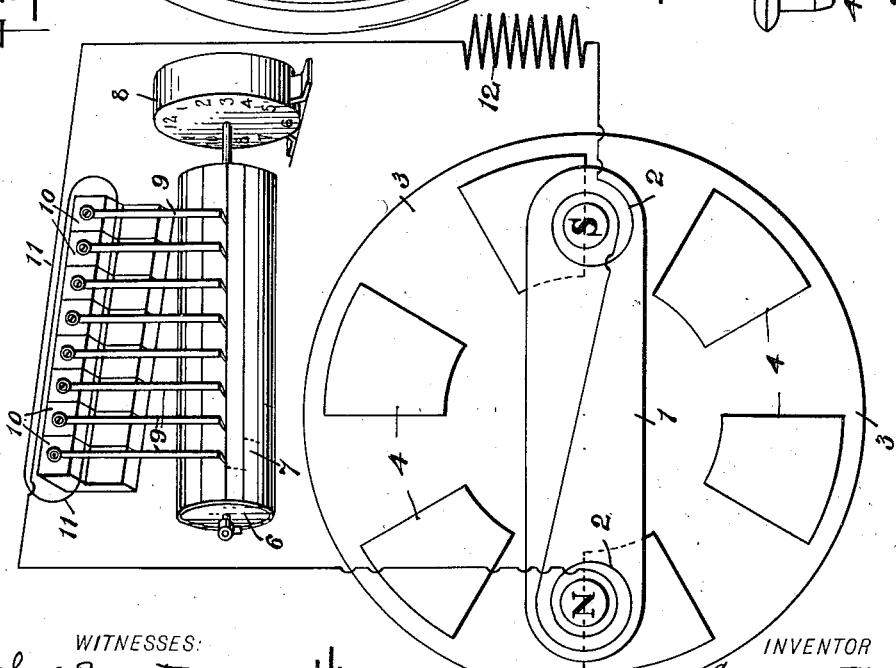
WITNESSES:
Johna Bergstrom
Chris. H. Almstead
INVENTOR
George P. Finnigan
BY
Laurence J. Gallagher
ATTORNEY

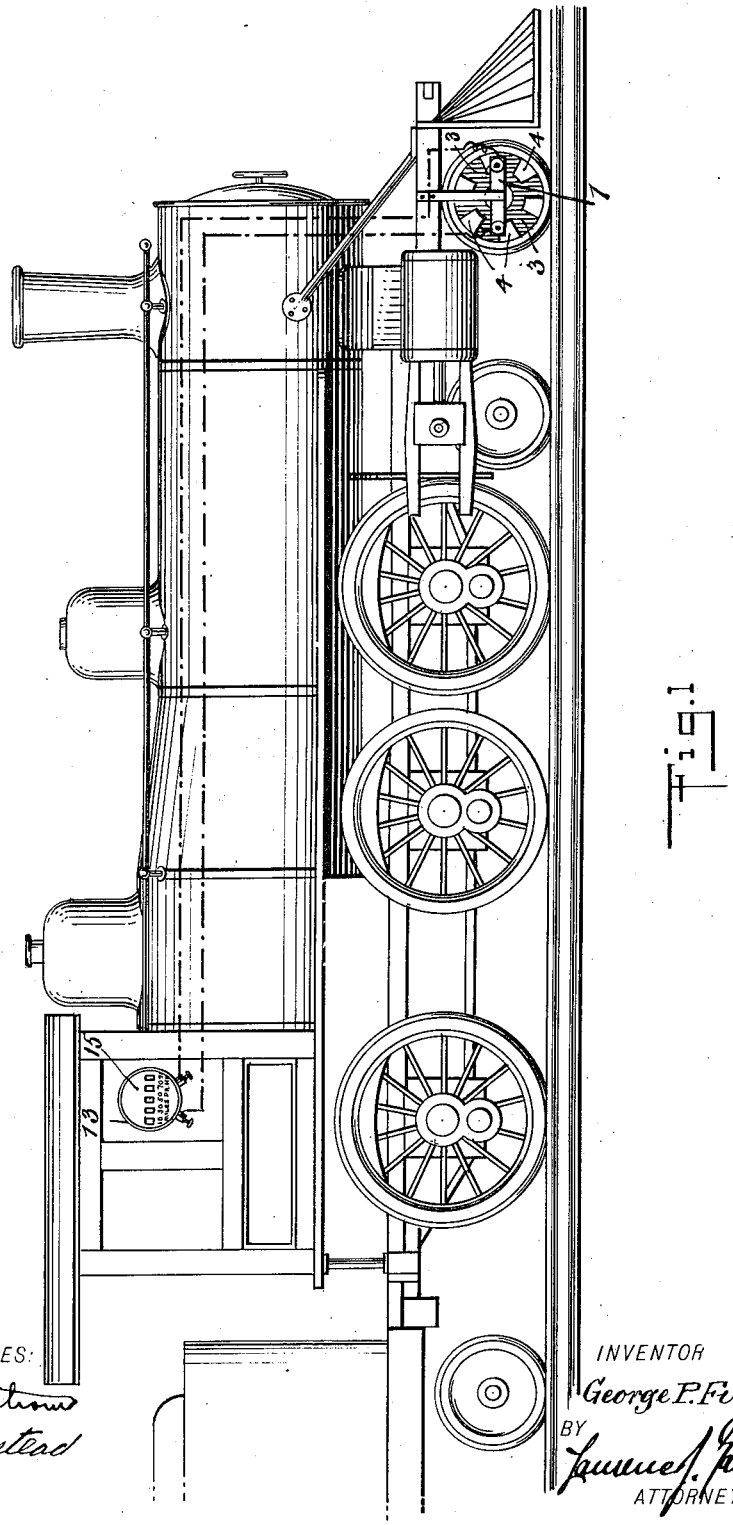

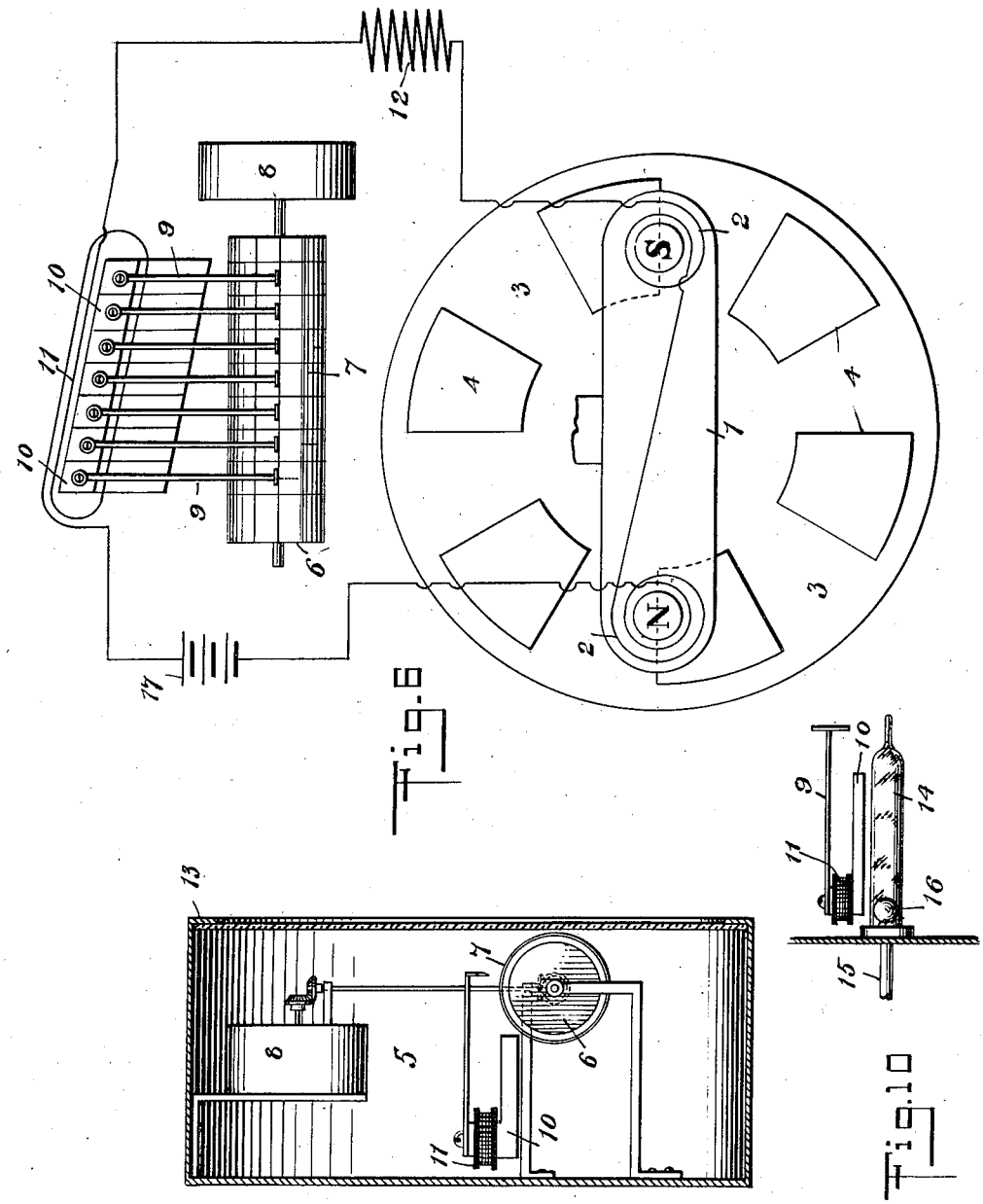

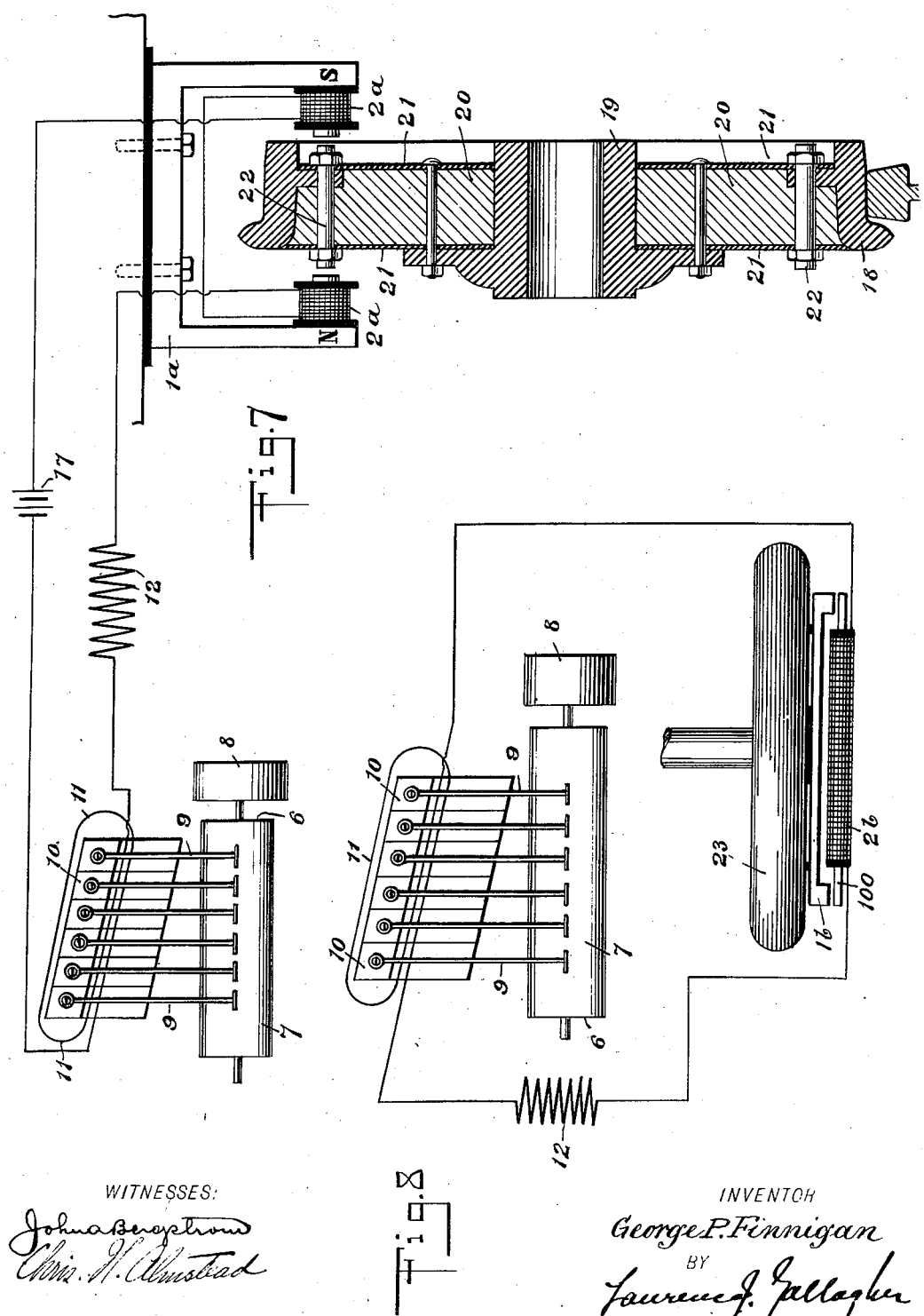

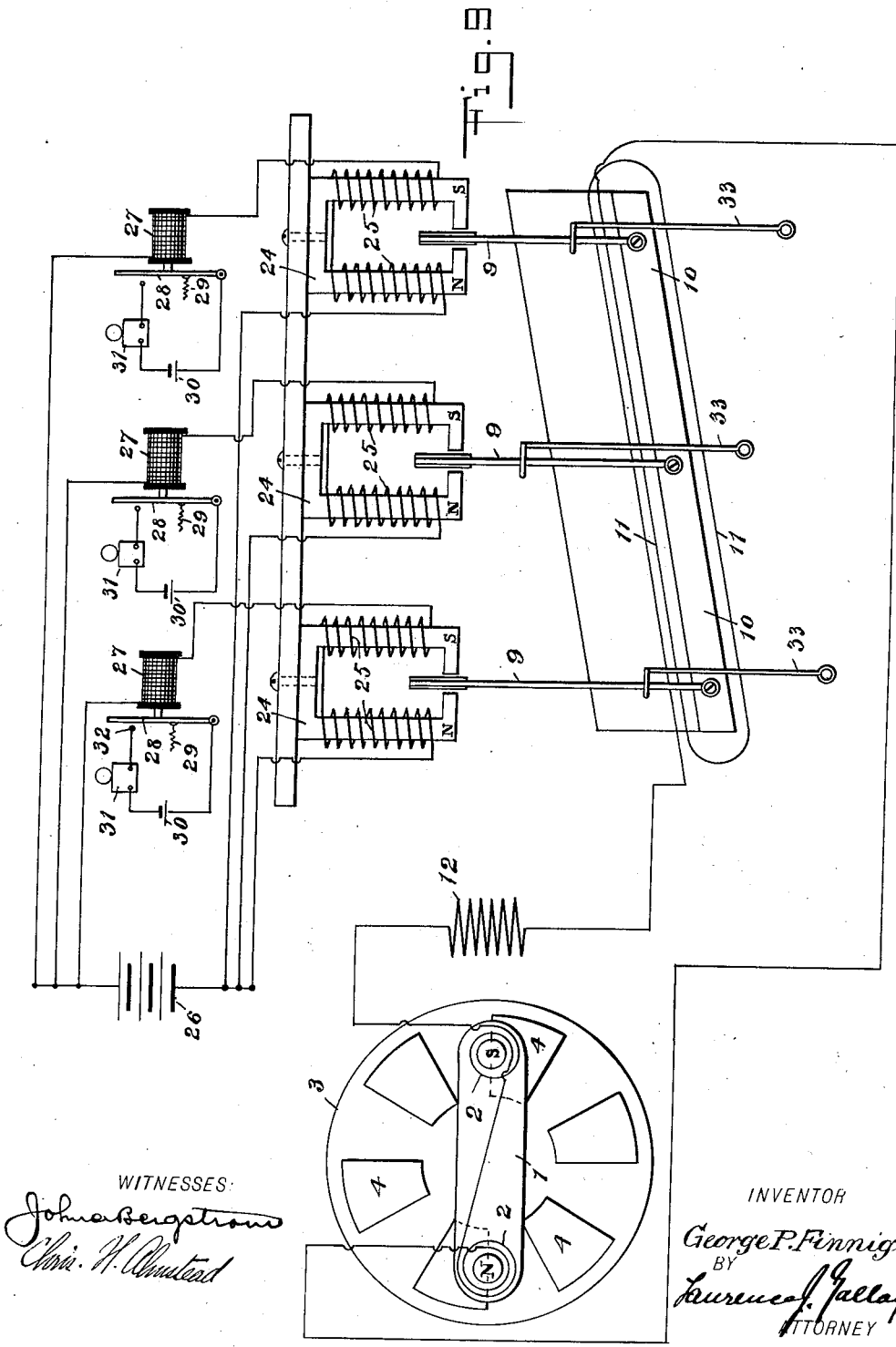

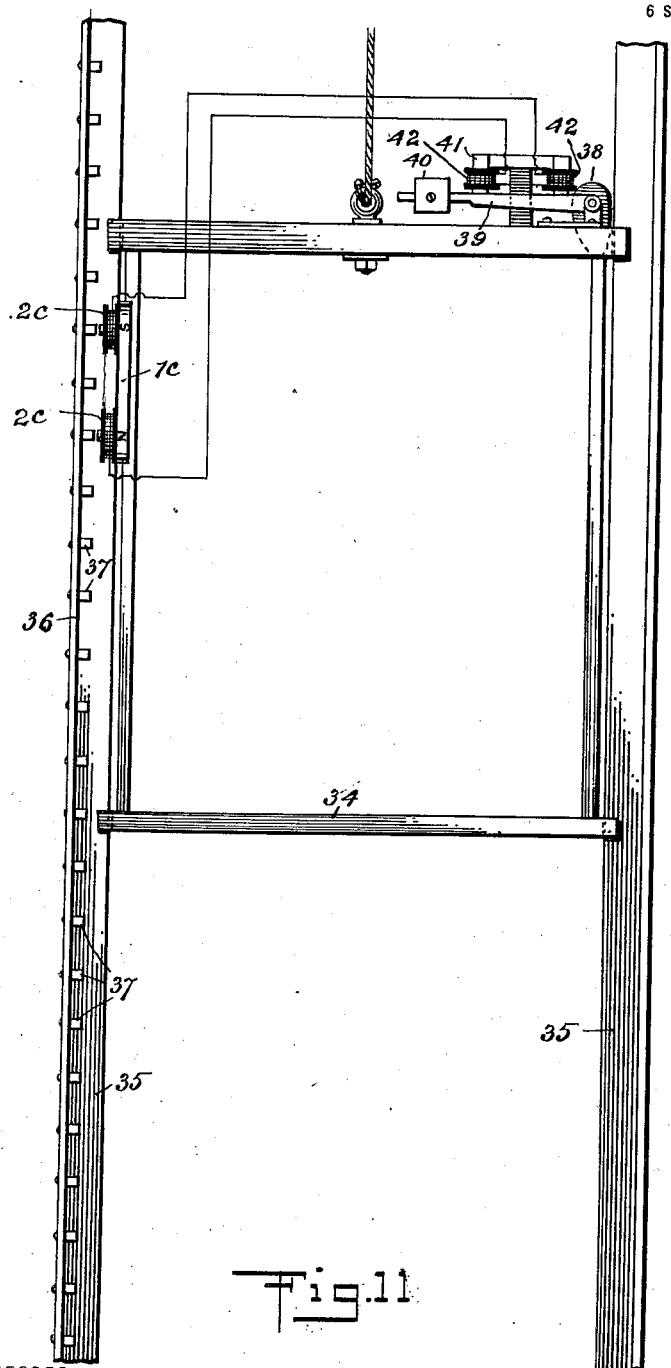

UNITED STATES PATENT OFFICE.

GEORGE P. FINNIGAN, OF RICHMOND, VIRGINIA.

SPEED-INDICATING MECHANISM.

1,165,082.  Specification of Letters Patent.  Patented Dec. 21, 1915.

Application filed April 24, 1913. Serial No. 763,239.

*To all whom it may concern:*

Be it known that I, GEORGE P. FINNIGAN, a citizen of the United States, and a resident of the city of Richmond, in the county of Henrico and State of Virginia, have invented new and useful Improvements in Speed-Indicating Mechanisms, of which the following is a full, clear, and exact description.

This invention relates to speed indicating mechanisms for vehicles, the new and useful results following the use of such mechanism appearing as the description of the construction and operation of the various forms thereof proceeds.

In the accompanying sheets of drawings, wherein like reference characters refer to like parts in the several views, Figure 1 shows the mechanism applied to a locomotive; Fig. 2 is a detail view of the locomotive wheel and the coöperating parts adjacent thereto; Fig. 3 is a plan view of the parts shown in Fig. 2; Fig. 4 is a diagrammatic view of the mechanism as an entirety; Fig. 5 is a sectional view of the indicating device; Fig. 6 is a diagrammatic view, similar to Fig. 4, and including a battery as an element of the mechanism; Fig. 7 is a detail of the locomotive wheel showing a different arrangement of the coöperating parts adjacent thereto; Fig. 8 is a diagrammatic view of the mechanism applied to a vehicle provided with a wheel of non-magnetic material; Fig. 9 is a diagrammatic view showing a modified indicating device; Fig. 10 is a detail view of the indicating device in coöperative relation with an element communicating with the air brake system; while Fig. 11 illustrates the invention applied to an elevator.

The inventive idea comprehends means for generating an alternating current, the frequency of which depends on the speed of the vehicle or body to which the invention is applied; a suitable device, which may assume a variety of forms, is adapted to be actuated by the current generated to the end that certain predetermined results may be brought about under certain circumstances.

An embodiment of the invention (Figs. 1 to 6) utilizes a permanent magnet in the form of a bar 1 having electro-magnets 2 secured thereto and extending laterally therefrom; this bar is fixedly secured to the vehicle, in this instance a locomotive, and adjacent to one of the wheels 3 thereof; the particular form or size of the wheel is of no consequence; the wheel is provided with a number of members or elements 4, the outer faces of which lie beyond or in advance of the side of the wheel, such members or elements being of magnetic material; the relation of these members with respect to the electro-magnets or windings 2 is such that as the wheel turns during movement of the vehicle they pass in front of such windings, the air gaps adjacent the ends of the windings being considerably less than when such members are adjacent thereto; these members 4 are analogous to pole pieces; the connecting portions or yokes being the wheel by which such members are carried; since the bar 1 is a permanent magnet a magnetic field is provided thereby, the intensity of which adjacent the cores of the windings 2 is varied as the said members 4 pass adjacent thereto.

The electro-magnets 2 are in electrical connection with each other and also with an indicating device, which, in this instance takes the form of a frequency indicator 5, the particular construction of which is well known; in Figs. 4 and 6 the diagrammatic representation of this indicator comprehends a drum 6 carrying a record sheet 7, a clock 8 turning the drum at a given rate; adjacent the drum and adapted to contact with the sheet 7, under certain conditions, are a number of reeds 9 of varying lengths carried by a metal core 10 having a winding 11 thereon, which winding is connected to the electro-magnets 2; the indicator also includes a resistance 12; the indicator of Fig. 5 is substantially the same as the one described the parts being shown in a case 13, a front view of which is set forth in Fig. 1.

As the locomotive moves along the track the frequency of the current generated in the windings 2 depends upon the rate of such movement; the periodicity of the reeds 9 is such that at certain speeds certain reeds will be thrown into vibration, each reed in its vibration representing a certain speed; at a speed of say, thirty miles per hour, the frequency of the generated current is a determined amount and there is a particular reed which will vibrate at this frequency, such reed in its vibration engaging the sheet 7 carried in the indicator and leaving a record thereon, the sheet being ruled to set forth hours and minutes as is common in such devices, the clock 8 keeping the sheet and drum in movement; other reeds in the indicator will vibrate at other speeds and thus a speed record of the locomotive or train is produced.

If it is desired to limit the speed of the locomotive to a determined rate the mechanism set forth in Fig. 10 may be used; a frangible tube 14 having the outer end sealed and the inner end in communication with the air brake system through a pipe or communicating member 15 is placed adjacent a certain reed representing a certain limiting speed; within the tube is a ball 16 which is free to move; if this particular reed 9 is thrown into vibration the outer end thereof will strike the tube 14 breaking it; the pressure within the tube will force the ball 16 toward the broken end of the tube thereby insuring communication of the member 15 with the atmosphere, since the force with which the ball moves entirely ruptures the outer end of the said tube; the consequence of which is the application of the brakes.

The intensity of the current flowing through the indicating mechanism circuit may be raised by placing a battery 17 (Figs. 6 and 7) in the circuit, the alternating current generated being superimposed on the direct battery current flowing therein, the resulting effect being substantially the same as already described.

In the arrangements of Figs. 6 and 7 including the batteries 17, which are sources of substantially unvarying electro-motive force, a battery current passing through the winding 11 normally produces a deflecting force upon each of the reeds. When a fluctuating or alternating electro-motive force is induced in the windings 2 or 2ᵃ, the current normally delivered by the source 17 is caused to fluctuate at the frequency of the electro-motive force induced in the windings 2 or 2ᵃ with resultant similar modification in the deflecting force exerted upon the reeds, and when the relative speed of the moving parts of the generator is at a predetermined value one of the reeds whose natural period corresponds with the frequency of fluctuation or alternation will be set into vibration.

The generator of fluctuating or alternating electro-motive-force has a moving part driven at a speed proportional to the speed to be indicated or measured, and the electro-motive-force generated and the frequency both increase as the speed to be measured increases. The result is that whether or not a battery is included in the circuit of the generator with the coil 11, with higher and higher speeds the electro-motive-force developed by the generator is higher and higher, with the result that the effect of increasing frequencies do not diminish the current strength in the coil 11 due to its inductance to the extent that it would be reduced if the electro-motive-force induced in the circuit remained constant. At the higher speeds and therefore higher frequencies of induced electro-motive-force the shorter reeds respond and, for a given extent of deflection of such short reeds, other things being equal, greater forces must be applied thereto. In consequence when using a generator of the character referred to the increasing electro-motive-force with increasing frequencies insures that there will be ample force applied to the shorter reeds to make them deflect sufficiently for the purposes intended, which would not be the case if the electro-motive-force did not increase with the frequency.

In Fig. 7 the adaptation of the invention to a car wheel of different construction is set forth; in this instance the wheel consists of a metal rim 18 and hub 19 with a non-metal annular portion 20; the shape of the wheel is retained by means of the side plates 21 of metal, held in position through the medium of bolts 22 extending from one side to the other; the permanent magnet 1ᵃ is of horseshoe form, the sides thereof embracing the wheel with the electro-magnets or windings 2ᵃ adjacent opposite sides of the wheel; the design of the magnet and the position of the windings thereon is such that the bolts 22 of the wheel are adapted to reduce the air-gap between the cores of the windings as the wheel turns; such reduction of the air-gap provides for a greater intensity of flux through the windings with consequent generation of current therein; the frequency of the generated current is proportional to the speed of the locomotive, the resultant effect of such frequency in relation to the indicating device being substantially as already described.

In Fig. 8 a wheel 23, substantially non-metallic, such as an automobile or vehicle wheel, is provided with a bar 1ᵇ which turns therewith, the bar being a permanent magnet, and a winding 2ᵇ is placed adjacent the wheel and on a core 100, fixed in position, the flux maintained by the magnet passing through the core at certain intervals during turning of the wheel; the frequency of the current generated in the winding is proportional to the speed of the vehicle, the resultant effect of such current in relation with the indicating device being substantially as already described. It is clear that the relative positions of the magnet and core may be reversed, i. e. that the winding may be carried on the magnet and that the magnet may turn with the core remaining stationary.

As before stated any suitable form of indicating device may be used as a portion of the mechanism and in Fig. 9 the indicator comprehends parts forming an alarm or signal system; the reeds 9, in construction and operation similar to what has already been set forth, coöperate with a number of electro-magnets which are substantially similar in construction and operation; the electro-magnet in this instance comprises a core 24 of horse-shoe form having the windings 25 thereon which are energized by a battery 26, the circuit including a relay 27 provided with an armature 28; the circuit is normally closed so that the armature is held adjacent the core of the relay; the current in the windings 25 sets up lines of force which travel through the core of the magnet and pass through the air-gap in which the upper end of the reed 9 is normally positioned and at rest; if the speed of the vehicle is such that a reed is thrown into vibration, rapidly passing back and forth through the said air-gap, the variation in the intensity of the lines of force in the air-gap induces an alternating current in the windings 25, which, through superposition on the direct current already flowing through such windings, causes a kick, as it were, or a condition of zero intensity of current, the armature 28 leaving the core of the relay 27 under the influence of the spring 29, or if so desired, under the influence of the force of gravity; the said armature 28 forms part of a local circuit made up of a battery 30 and an alarm 31, with a contact 32 adapted to engage with the armature whereby the local circuit is closed, such closure taking place at zero current intensity in the relay 27; thus the vibration of a reed which corresponds to a given speed of the vehicle will announce such speed; if desired the reeds may be provided with brakes 33 whereby vibration is prevented.

The invention may be adapted to vehicles of different kinds and in Fig. 11 an arrangement of parts is shown in conjunction with an elevator; the car 34 is guided by means of the ways 35 and adjacent the car is a member 36 of magnetic material and carrying a number of projections 37; the car is provided with a permanent magnet 1ᶜ carrying windings 2ᶜ, the cores thereof being adapted to pass closely adjacent the said projections as the car travels; the car is provided with a brake in the nature of a cam lever 38 having an arm 39 on which is a counterpoise 40 the tendency of which is to bring the cam into engagement with the adjacent way 35 whereby the car may be stopped; the cam is held in inoperative position by means of a permanent magnet 41 having windings 42 thereon and in circuit with the windings 2ᶜ; the arm 39 being held adjacent the magnet by reason of the magnetic field thereof; if the speed of the car exceeds a certain amount the relative movement of the windings 2ᶜ and the projections 37 will induce a current in the windings due to the rate of cutting of the lines of force set up by the magnet 1ᶜ by the projections 37; the effect of the current flowing in the winding 42 is to weaken the field of the magnet 41 and when the speed of the car reaches a certain amount the magnetic fields are equal and opposite with resultant release of the arm 39; the cam 38 comes to operative position in engagement with the way 35 and the car is stopped; the magnet 41 and the winding 42 serve as an indicating device for the speed of the car; the counterpoise 40 maintains the cam in operative position as the field strength of the magnet 41 is not sufficient to bring the arm 39 adjacent thereto.

It is of course clear that various other arrangements may be made by selecting certain parts from the different constructions set forth, the result, however, as far as the inventive idea is concerned, being unchanged.

What I claim as my invention is—

1. Speed indicating apparatus comprising the combination with a generator of fluctuating electro-motive force varying in magnitude and in frequency with the speed to be indicated, of a source of substantially unvarying electro-motive force, and means responsive to currents of different frequencies having a winding connected in circuit with said generator and said source of electromotive force.

2. Speed indicating apparatus comprising the combination with a generator of fluctuating electro-motive force varying in magnitude and in frequency with the speed to be indicated, of a source of substantially unvarying electro-motive force, means responsive to currents of different frequencies comprising a plurality of reeds of different natural periods, and electro-magnetic means controlling said reeds connected in circuit with said generator and said source of electro-motive force.

3. Speed indicating apparatus comprising the combination with a plurality of reeds having different natural periods, of a source of current and electro-magnetic means energized thereby normally exerting a deflecting force varying in magnitude and frequency with the speed to be indicated upon said reeds, and a generator of fluctuating electromotive force varying said deflecting force.

4. Speed indicating apparatus comprising the combination with a reed, of a source of current and electro-magnetic means energized thereby normally exerting a deflecting force on said reed, and means producing a fluctuating electro-motive force varying in magnitude and frequency with the speed to be indicated for modifying said deflecting force.

5. Speed indicating apparatus comprising the combination with a reed, of a source of current and electro-magnetic means energized thereby normally exerting a deflecting force on said reed, means producing a fluctuating electro-motive force varying in magnitude and frequency with the speed to be indicated, and a circuit including said means, said source and said electro-magnetic means.

6. Speed indicating apparatus comprising the combination with means selective of a current of predetermined frequency, said means including an electro-magnet, of a generator of fluctuating electro-motive-force varying in magnitude and frequency with the speed to be indicated, and a circuit connecting said electro-magnet with said generator.

7. Speed indicating apparatus comprising the combination with means selective of a current of predetermined frequency, said means including an electro-magnet, of a generator of fluctuating electro-motive-force varying in magnitude and frequency with the speed to be indicated, a circuit connecting said electro-magnet with said generator, and a resistance in circuit with said electro-magnet.

8. Speed indicating apparatus comprising the combination with means selective of a current of predetermined frequency, said means including an electro-magnet, of a generator of fluctuating electro-motive-force varying in magnitude and frequency with the speed to be indicated, a circuit connecting said electro-magnet with said generator, and a resistance and a source of substantially constant electro-motive-force in circuit with said electro-magnet.

9. Speed indicating apparatus comprising the combination with reeds of different periods, of an electro-magnet controlling said reeds, and a generator of fluctuating electro-motive-force varying in magnitude and frequency with the speed to be indicated connected in circuit with said electro-magnet.

10. Speed indicating apparatus comprising the combination with reeds of different periods, of an electro-magnet controlling said reeds, a generator of fluctuating electro-motive-force varying in magnitude and frequency with the speed to be indicated connected in circuit with said electro-magnet, and a resistance in circuit with said electro-magnet.

11. Speed indicating apparatus comprising the combination with reeds of different periods, of an electro-magnet controlling said reeds, a generator of fluctuating electro-motive-force varying in magnitude and frequency with the speed to be indicated connected in circuit with said electro-magnet, and a resistance and a source of substantially constant electro-motive-force in circuit with said electro-magnet.

In testimony whereof I have signed my name in the presence of two witnesses.

GEORGE P. FINNIGAN.

Witnesses:
CHRIS. H. OLMSTEAD,
WILLIAM MILLER.